United States Patent
Raney et al.

(10) Patent No.: US 9,169,067 B2
(45) Date of Patent: Oct. 27, 2015

(54) SYSTEM AND METHOD TO ASSIST IN LIFTING A VESSEL

(75) Inventors: Adam Raney, Hebron, KY (US); Thomas Hanson, Loveland, OH (US)

(73) Assignee: M-I L.L.C., Houston, TX (US)

( * ) Notice: Subject to any disclaimer, the term of this patent is extended or adjusted under 35 U.S.C. 154(b) by 254 days.

(21) Appl. No.: 13/589,406

(22) Filed: Aug. 20, 2012

(65) Prior Publication Data

US 2014/0050553 A1    Feb. 20, 2014

(51) Int. Cl.
| | |
|---|---|
| *B66D 1/00* | (2006.01) |
| *B65G 1/02* | (2006.01) |
| *B65D 88/30* | (2006.01) |
| *B65D 88/12* | (2006.01) |
| *B65D 90/00* | (2006.01) |

(52) U.S. Cl.
CPC ............... *B65G 1/02* (2013.01); *B65D 88/128* (2013.01); *B65D 88/30* (2013.01); *B65D 90/0033* (2013.01)

(58) Field of Classification Search
USPC ................................................ 254/264–266
See application file for complete search history.

(56) References Cited

U.S. PATENT DOCUMENTS

| | | | | | |
|---|---|---|---|---|---|
| 4,365,576 | A | * | 12/1982 | Cook | 405/200 |
| 5,558,246 | A | * | 9/1996 | Ross, Jr. | 220/737 |
| 7,303,672 | B2 | * | 12/2007 | Irvine | 210/223 |
| 7,621,565 | B2 | * | 11/2009 | Ross et al. | 280/830 |
| D661,371 | S | * | 6/2012 | Willard et al. | D23/206 |
| 2006/0081543 | A1 | * | 4/2006 | Irvine | 210/791 |
| 2010/0051567 | A1 | * | 3/2010 | Ross, Jr. | 211/85.18 |
| 2010/0303973 | A1 | * | 12/2010 | Popeil et al. | 426/233 |
| 2011/0123362 | A1 | * | 5/2011 | Etter et al. | 417/234 |

* cited by examiner

*Primary Examiner* — Emmanuel M Marcelo (57) ABSTRACT

A system includes a vessel configured to contain a substance therein having a top end and a bottom end with a center-of-gravity for the vessel disposed between the top end and the bottom end, a frame connected to the vessel, a cable link connected to the frame configured to connect a cable thereto, and a cable support connected to the vessel or the frame. The cable support disposed above the center-of-gravity of the vessel with respect to the top end and the bottom end of the vessel. As the vessel moves from a first position to a second position, the cable engages the cable support such that a lifting force is translated from the cable and through the cable support to have the cable move the vessel through the cable support, the cable support attached to the frame or the vessel with the cable support disposed above the center-of-gravity.

19 Claims, 4 Drawing Sheets

SYSTEM AND METHOD TO ASSIST IN LIFTING A VESSEL

BACKGROUND ART

Many industries involve moving, lifting, and otherwise handling larger scale equipment and vessels, in which this equipment must be handled in a safe and effective manner to protect the personnel handling the equipment, and the equipment itself. For example, in the oil and gas industry, separators are transported between various locations and wells to remove gas and water from an oil producing well before the oil is ready to be discharged for export. Separators are horizontal (e.g., horizontally oriented) or vertical (e.g., vertically oriented), and separators can be classified into two-phase or three-phase separators.

A vertical separator is transported in a horizontal orientation, and the separator is lifted from the horizontal orientation to a vertical orientation when the separator is at a desired location for use, such as when at the location of the wellhead. Separators vary in size and weight, such as up to about 30 ft (9.1 m) in overall height and weigh up to 24,000 lb (10,866 kg). A lifting device, such as a crane, or other associated equipment is used to lift and reorient the separator from the horizontal orientation to the vertical orientation for use. Due to the overall size and weight, this reorientation of the separator must be performed in a safe and effective manner for the safety of the handling personnel and to prevent damage to the separator and other equipment. Similar issues apply in other industries that relate to moving and lifting larger scale vessels having a large height to width/depth ratio with significant weight.

DETAILED DESCRIPTION

The following examples relate to embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

Certain terms are used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component is coupled to a second component, that connection may be through a direct connection, or through an indirect connection via other components, devices, and connections. Further, the terms "axial" and "axially" generally mean along or parallel to a central or longitudinal axis, while the terms "radial" and "radially" generally mean perpendicular to a central longitudinal axis. Additionally, directional terms, such as "above," "below," "upper," "lower," "horizontal," "vertical," "top," "bottom," etc., are used for convenience in referring to the accompanying drawings, and the terms are not meant to limit the disclosure.

In one aspect, embodiments disclosed herein relate to a method, a system, and an apparatus that may be used to assist in lifting a vessel. For example, embodiments disclosed herein may relate to assisting reorientation of a vessel, such as when moving, lifting, or otherwise reorienting a vessel from a vertical position to a horizontal position and/or from a horizontal position to a vertical position. The system may include the vessel that may be used to contain a substance therein, in which a frame may be connected to the vessel to provide support to the vessel.

One or more cable links and one or more cable supports may be coupled to the vessel to assist in lifting the vessel. For example, a cable link may be connected to the frame to facilitate connecting a cable to the vessel using a cable link, and a cable support may be connected to the vessel and/or the frame to support the cable from the cable support. As the vessel may have a top end and a bottom end, the cable support may be disposed closer to the top end of the vessel than the bottom end of the vessel to facilitate lifting the vessel. Further, the cable link may be disposed closer to the top end of the vessel than the bottom end of the vessel to facilitate lifting the vessel, in which the cable support may be disposed closer to the top end of the vessel than the cable link.

In an embodiment in which more than one cable link and more than one cable support is used, such as by using a first cable link, a second cable link, a first cable support, and a second cable support, the first cable support and the second cable support may be disposed on opposite sides of the vessel. Further, if the first cable link and the second cable link are connected to the frame, the first cable link and the second cable link may be disposed on opposite sides of the frame.

Figure 1A:
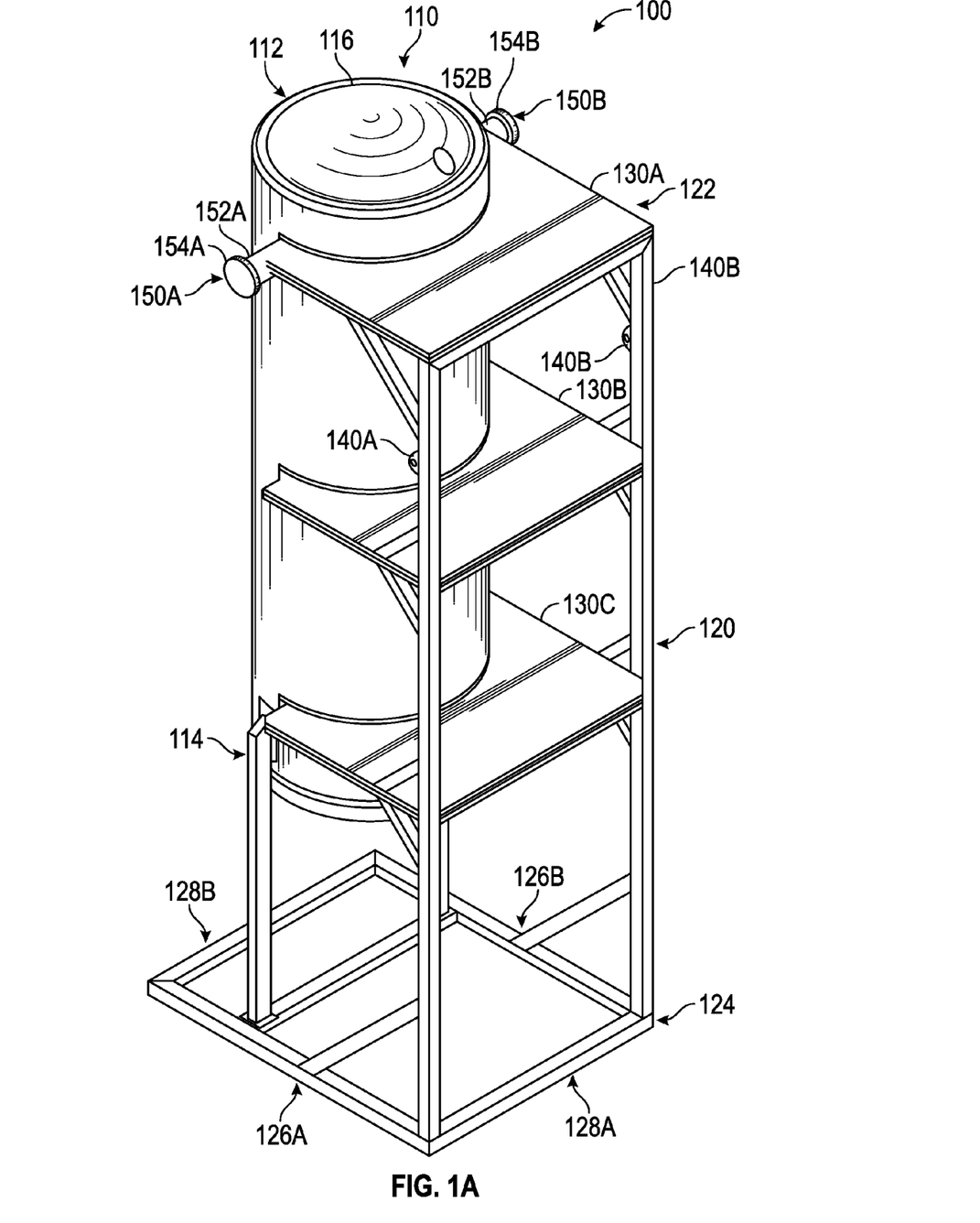
FIG. 1A shows an above perspective view of a system to assist in lifting a vessel in accordance with one or more embodiments of the present disclosure.
Figure 1B:
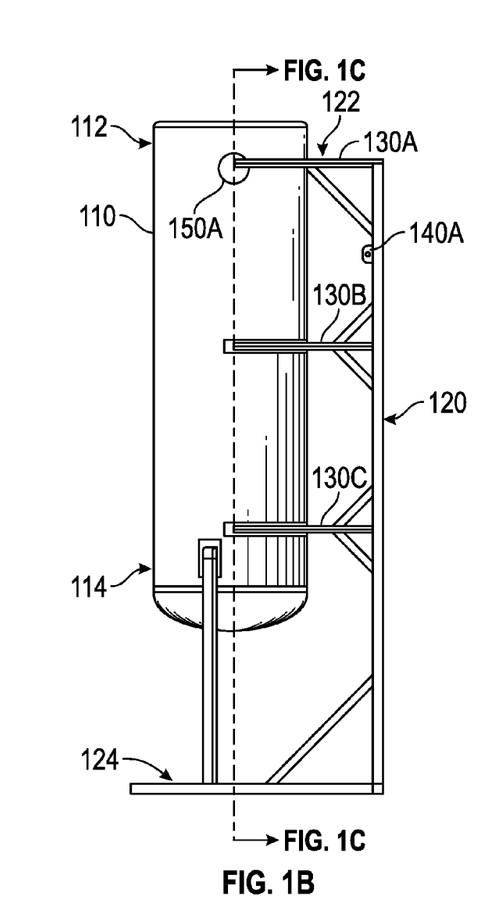
FIG. 1B shows a side perspective view of a system to assist in lifting a vessel in accordance with one or more embodiments of the present disclosure.
Figure 1C:
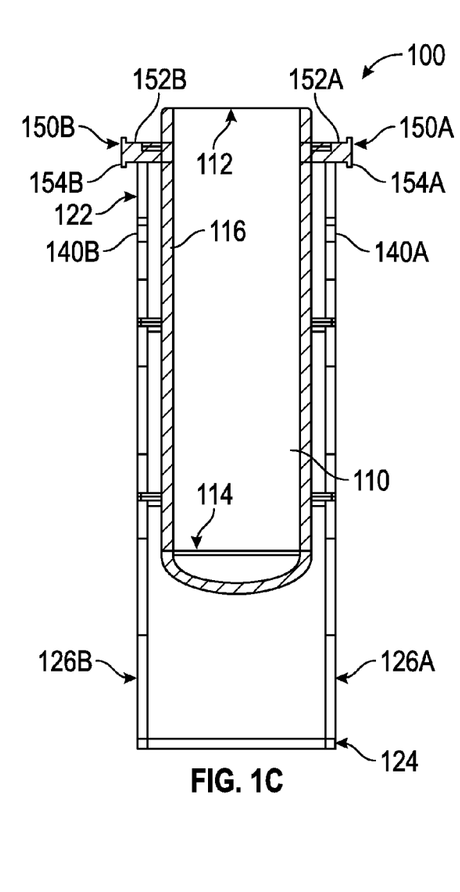
FIG. 1C shows a cutaway cross-section view of a system to assist in lifting a vessel in accordance with one or more embodiments of the present disclosure.
Figure 1D:
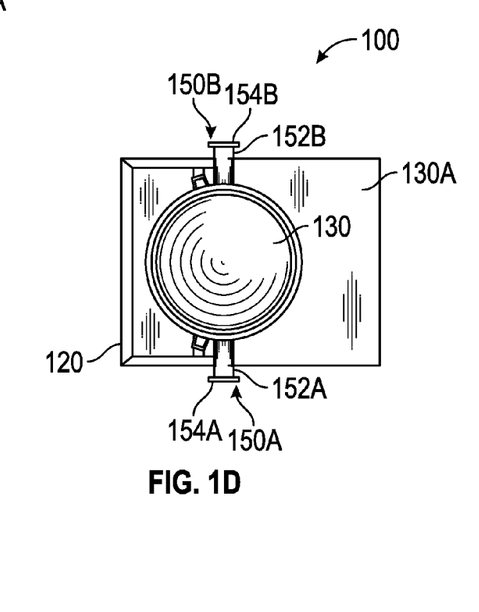
FIG. 1D shows an above view of a system to assist in lifting a vessel in accordance with one or more embodiments of the present disclosure.

Referring now to FIGS. 1A-1D, multiple views of a system 100 to assist in lifting a vessel 110 in accordance with one or more embodiments of the present disclosure are shown. Particularly, FIG. 1A provides an above perspective view of the system 100, FIG. 1B provides a side perspective view of the system 100, FIG. 1C provides a cutaway cross-sectional view of the system 100, and FIG. 1D provides an above view of the system 100.

As shown, the system 100 includes the vessel 110 that may be used to contain a substance therein, and may further include a frame 120 attached to the vessel 110 to provide support to the vessel 110. For example, in one or more embodiments, to enable the vessel 110 to have a vertical orientation (as shown) and/or a horizontal orientation, the frame 120 may be used to support the vessel 110 such that the vessel 110 may rest in either orientation or be moved between orientations and prevent unnecessary stress or damage to the vessel 110. Further, the frame 120 may surround the vessel 110, at least partially, such that the frame 120 may protect one or more sides of the vessel 110. The frame 120 may be attached to the vessel 110, such as by securing and attaching the frame 120 to the vessel 110 at multiple various points to provide adequate support and structure to the vessel 110. As such, the vessel 110 may be moved, transported, and otherwise handled by moving and handling the frame 120 attached to the vessel 110, which may prevent unnecessary stress or damage to the vessel 110.

The frame 120 may be removably connected or permanently connected to the vessel 110. For example, if the frame 120 is removably connected to the vessel 110, the vessel 110 may be readily removable from the frame 120. In such an embodiment, the frame 120 and the vessel 110 may be connected such as by having hinges, connecting members, or connecting mechanisms that removably engage and connect to the frame 120 to the vessel 110. If the frame 120 is permanently connected to the vessel 110, the vessel 110 may not be readily removable from the frame 120. For example, in such an embodiment, the frame 120 may be connected to the vessel 110, such as by using a welding process, a brazing process, an adhesive material, a laser deposition process, a particle deposition process, and/or any other process or method known in the art.

The system 100 may further include one or more cable links 140A, 140B coupled to the vessel 110. For example, as shown, the system 100 may include a first cable link 140A and a second cable link 140B. The first cable link 140A and the second cable link 140B may be connected to the frame 120 of the system 100. The one or more cable links 140A, 140B may be used to facilitate coupling one or more cables (not shown) to the system 100, such as by having a first cable connected to the frame 120 using the first cable link 140A and a second cable connected to the frame 120 using the second cable link 140B. The system 100 may then be lifted using the one or more cable links 140A, 140B as connection points for one or more cables of a lifting device, such as a crane. Those having ordinary skill in the art will appreciate that though the present disclosure refers to a cable to attach to and lift the vessel, the present disclosure contemplates that other linear members may also be used, including a wire, a cable, a rope, a line, a lead, a chain, a sling, and/or any other linear member known in the art. Further, the one or more cable links 140A, 140B are shown as including a pad eye. Those having ordinary skill in the art will appreciate, however, that the present disclosure is not so limited, as any type of connector or link to connect a cable to the system may be used in accordance with the present disclosure.

Further, the system 100 may include one or more cable supports 150A, 150B coupled to the vessel 110. For example, the system 100 may include a first cable support 150A and a second cable support 150B. The first cable support 150A and the second cable support 150B may be secured to the vessel 110 and/or the frame 120. For example, the first cable support 150A and/or the second cable support 150B may be integrally formed with, welded to, or fastened onto the vessel 110 and/or the frame 120. As shown in FIGS. 1A-1D, the first cable support 150A and the second cable support 150B may be connected to both the vessel 110 and the frame 120 for additional support. The one or more cable supports 150A, 150B may be used to support one or more cables (not shown) coupled to the system 100, such as by having the first cable support 150A support the first cable that is connected to the first cable link 140A and the second cable support 150B support the second cable that is connected to the second cable link 140B.

The one or more cable links 140A, 140B and the one or more cable supports 150A, 150B may be connected within the system 100, such as by using a welding process, a brazing process, an adhesive material, a laser deposition process, a particle deposition process, and/or any other process or method known in the art. These connections may be conducted in accordance with the standards of American Society of Mechanical Engineers (ASME®). As such, in one or more embodiments, a treatment may be used to facilitate the connections, such as by using a postweld heat treatment to improve the properties of the connections.

If the system 100 is in a horizontal orientation and is being reoriented to a vertical orientation, the system 100 may be lifted using the first cable connected to the first cable link 140A and the second cable connected to the second cable link 140B. As the system 100 is reorienting, the first cable may engage the first cable support 150A and the second cable may engage the second cable support 150B, thereby enabling the lifting force of the first cable and the second cable to translate through the first cable support 150A and the second cable support 150B (shown and discussed more below). Particularly, one of the ends of the system 100 may be supported by a surface that the system 100 is resting upon, while the other end of the system 100 may be supported and lifted by the first cable and the second cable through the first cable link 140A and the second cable link 140B. As the system 100 is reorienting, the first cable may engage the first cable support 150A by having the first cable position, at least partially, about the first cable support 150A, and the second cable may engage the second cable support 150B by having the second cable position, at least partially, about the second cable support 150B. As the first cable and the second cable are further moved and lifted, a lifting force may be generated through the first cable support 150A and the second cable support 150B from the first cable and the second cable positioned thereabout, thereby having the first cable and the second cable using this engagement and curvature to lift and reorient the system 100 and the vessel 110 from a horizontal orientation to a vertical orientation. A similar reverse process may be used when the system 100 is in a vertical orientation and is being reoriented to a horizontal orientation.

Referring still to FIGS. 1A-1D, the vessel 110 may have a length defined between a top end 112 and a bottom end 114. The frame 120 may extend along the length of the vessel 110 between a top end 122 and a bottom end 124. In an embodiment, the bottom end 124 of the frame 120 may extend beyond the bottom end 114 of the vessel 110, and the top end 122 of the frame 120 may terminate between the top end 112 and the bottom end 114 of the vessel 110, such as adjacent to the top end 112 of the vessel 110. In accordance with one or more embodiments of the present disclosure, the one or more cable supports 150A, 150B may be disposed closer to the top end 112 of the vessel 110 than the bottom end 114 of the vessel 110 to facilitate lifting the vessel 110 when the cables engage the one or more cable supports 150A, 150B. Similarly, the one or more cable links 140A, 140B may be disposed closer to the top end 112 of the vessel 110 than the bottom end 114 of the vessel 110. As such, the one or more cable supports 150A, 150B may be disposed closer to the top end 112 of the vessel 110 than the one or more cable links 140A, 140B.

In accordance with one or more embodiments of the present disclosure, the one or more cable supports 150A, 150B and/or the one or more cable links 140A, 140B may be coupled to the system 100 and the vessel 110 in an upper half thereof, such as with the system 100 extending between the top end 122 and the bottom end 124 and the upper half terminating at the top end 122 and a bottom half terminating at the bottom end 124. This configuration may enable a center-of-gravity of the system 100 to be disposed below a center-of-lift of the system 100. More specifically, if the system 100 is divided into quarters with the uppermost quarter terminating at the top end 122 and the lowermost quarter terminating at the bottom end 124, the one or more cable supports 150A, 150B and/or the one or more cable links 140A, 140B may be coupled to the system 100 and the vessel 110 in the uppermost quarter thereof. This configuration may ensure that the center-of-lift of the system 100 is above the center-of-gravity of the system 100. The center-of-gravity of the system 100 may be located substantially at about a midway point between the top end 112 and the bottom end 114 of the vessel 110. As such, the one or more cable supports 150A, 150B may be disposed above the center-of-gravity of the system 100, with the one or more cable supports 150A, 150B disposed closer to the top end 112 than the bottom end 114 of the vessel 110. In one or more embodiments, the one or more cable links 140A, 140B may then be disposed between the one or more cable supports 150A, 150B and the center-of-gravity of the system 100.

Further, the system 100 and the frame 120 may have a first side 126A and a second side 126B, which are formed on opposite sides of each other, and may also have a front side 128A and a back side 128B. As shown, the first cable link 140A and/or the first cable support 150A may be disposed on the first side 126A of the system 100 and the frame 120, and the second cable link 140B and/or the second cable support 150B may be disposed on the second side 126B of the system 100 and the frame 120. As such, the first cable link 140A and the second cable link 140B may be disposed on opposite sides of the system 100 and the frame 120, and the first cable support 150A and the second cable support 150B may be disposed on opposite sides of the system 100 and the frame 120. Further, as shown, the first cable link 140A and the second cable link 140B may be disposed adjacent to the front side 128A of the system 100 and the frame 120. Furthermore, the one or more cable supports 150A, 150B may be disposed substantially aligned with a centerline of the vessel 110 from the perspective of the first side 126A and the second side 126B, as shown in FIGS. 1A-1C. These configurations may facilitate having the one or more cables engage the one or more cable supports 150A, 150B as the system 100 is reorienting between the horizontal orientation and the vertical orientation.

As shown in FIGS. 1A-1D, the vessel 110 may include a body 116 having a cylindrical shape. Further, the vessel 110 and system 100 may include a separator, in which the vessel 110 may be used to contain and separate a multiphase fluid. An example of such a separator is a mud/gas Separator that may be used in oilfield applications. As such, in accordance with one or more embodiments of the present disclosure, the system 100 including the vessel 110 and the frame 120 may have a height of about 30 ft (9.1 m), a width of about 8 ft (2.4 m), and a depth of about 10 ft (3.0 m), and may have a weight of about 24,000 lb (10,866 kg). Those having ordinary skill in the art will appreciate, however, that though the body 116 of the vessel 110 includes a cylindrical shape, the present disclosure is not so limited, as other shapes, such as a rectangular shape, elliptical shape, and/or any other shape may be used for the vessel 110 to contain a substance therein.

Further, the frame 120 may include multiple elements or structures to support the vessel 100. For example, the frame 120 may include one or more platforms 130 that connect to the body 116 of the vessel 110. In FIGS. 1A-1D, the platform is shown having a first platform 130A, a second platform 130B, and a third platform 130C, each connected to the body 116 of the vessel 110. Further, supports and struts may be included within the frame 120 to provide support to the one or more platforms 130. Those having ordinary skill in the art will appreciate that while three platforms are shown in this embodiment, any number of platforms may be used in accordance with the present disclosure.

Referring still to FIGS. 1A-1D, the one or more cable supports 150A, 150B of the system 100 may include a cylindrical member 152A, 152B with a flange 154A, 154B disposed at an end thereof. For example, the first cable support 150A may include a first cylindrical member 152A with a first flange 154A connected at an end thereof, and the second cable support 150B may include a second cylindrical member 152B with a second flange 154B connected at an end thereof. The cylindrical member 152A, 152B of the one or more cable supports 150A, 1500B may be used to receive and support the cables when the cables engage the one or more cable supports 150A, 150B, and the flange 154A, 154B may be used to prevent the cables from disengaging or sliding off the one or more cable supports 150A, 150B. As such, the cylindrical member 152A, 152B of the one or more cable supports 150A, 150B may include a tubular member, such as an 8 in (20 cm) tubular member (e.g., pipe), connected to the vessel 110 and/or the frame 120 of the system 100. Further, the one or more cable supports 150A, 150B may include structures therein to increase the rigidity of the one or more cable supports 150A, 150B. For example, one or more ribs, gussets, plates, or other structures may be included therein to increase the rigidity of the one or more cable supports 150A, 150B.

The flange 154A, 154B of the one or more cable supports 150A, 150B are shown as extending past the sides 126 of the system 100 and the frame 120. However, one having ordinary skill in the art will appreciate that the flange 154A, 154B of the one or more cable supports 150A, 150B may be formed as substantially aligned or flush with the sides 126 of the system 100 and the frame 120. For example, the first flange 154A of the first cable support 150A may be aligned or flush with the first side 126A and/or the first platform 130A, and similarly the second flange 154B of the second cable support 150B may be aligned or flush with the second side 126B and/or the first platform 130A. Further, the one or more cable supports 150A, 150B may each include more than one flange, as desired. For example, the flange 154A, 154B is shown disposed at an end of the one or more cable supports 150A, 150B. However, an additional flange may be included, such as within the interior or disposed about the cylindrical member 152A, 152B of the one or more cable supports 150A, 150B, to provide a guide for the cables engaged with the one or more cable supports 150A, 150B.

Those having ordinary skill in the art will appreciate that though the one or more cable supports 150A, 150B are shown including the cylindrical member 152A, 152B, the present disclosure is not so limited, as other members and shapes, such as a rectangular member, elliptical member, and/or any other member may be used for the one or more cable supports 150A, 150B. In an embodiment in which the one or more cable supports 150A, 150B include the cylindrical members 152A, 152B, the flanges 154A, 154B may have a diameter that is greater than that of the cylindrical members 152A, 152B to prevent cables from disengaging the cylindrical members 152A, 152B of the one or more cable supports 150A, 150B. In an embodiment in which the one or more cable supports 150A, 150B do not include a cylindrical shape, the flanges 154A, 154B may have an outer surface that extends out further than the outermost surface of the one or more cable supports 150A, 150B, thereby enabling the flanges 154A, 154B to prevent cables from disengaging the one or more cable supports 150A, 150B.

Figure 2A:
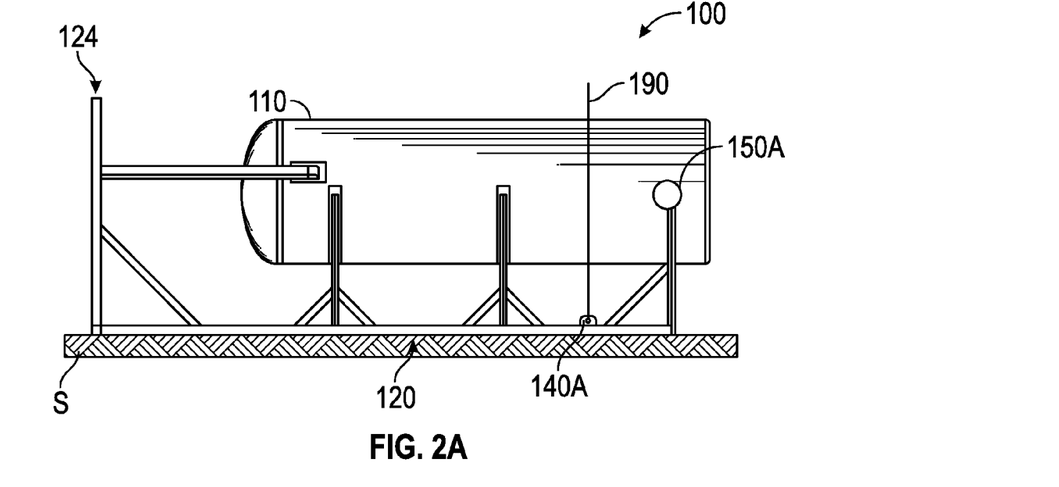
FIG. 2A shows a side perspective view of a vessel and a system in a horizontal orientation in accordance with one or more embodiments of the present disclosure.
Figure 2B:
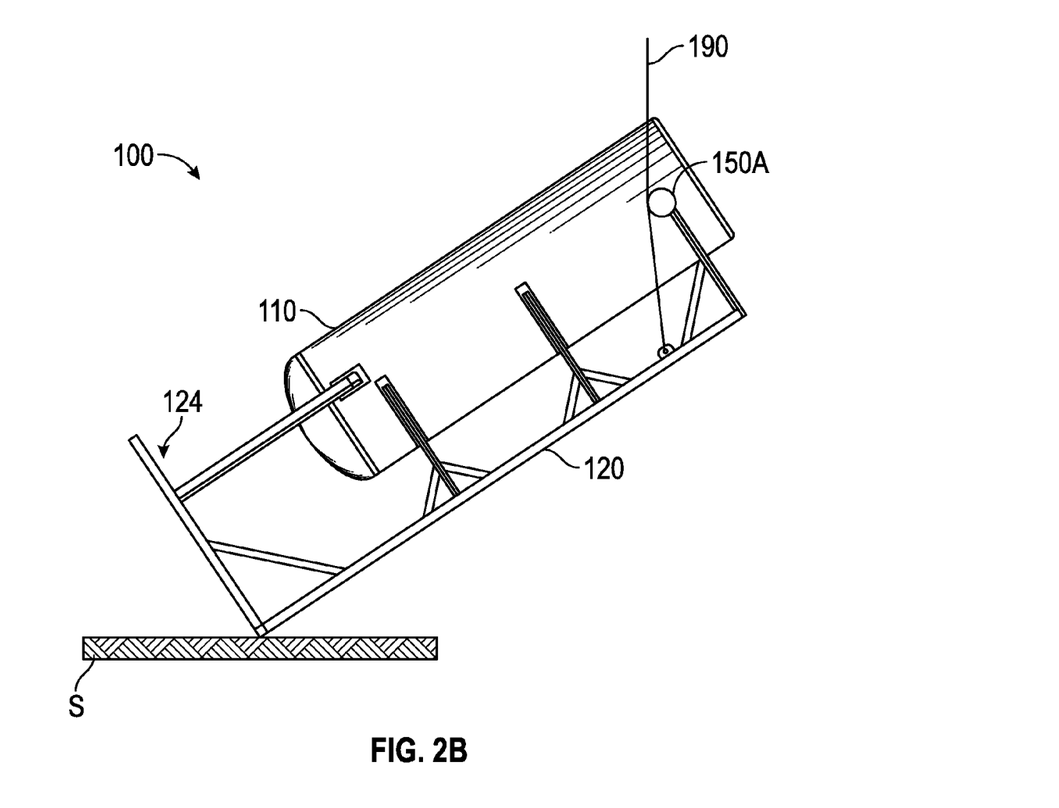
FIG. 2B shows a side perspective view of a vessel and a system in between a horizontal orientation and a vertical orientation in accordance with one or more embodiments of the present disclosure.
Figure 2C:
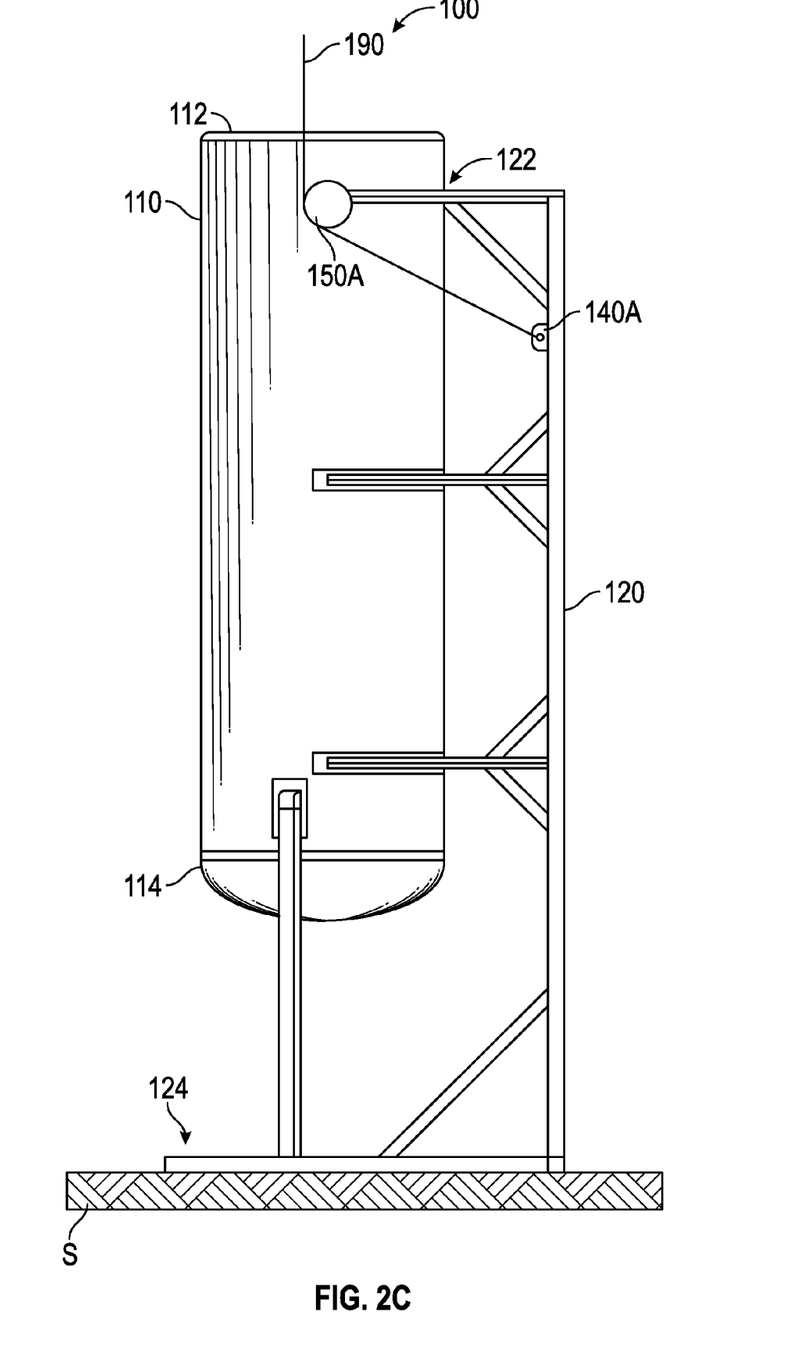
FIG. 2C shows a side perspective view of a vessel and a system in a vertical orientation in accordance with one or more embodiments of the present disclosure.

Referring now to FIGS. 2A-2C, multiple views of a method to assist in lifting the vessel 110 in accordance with one or more embodiments of the present disclosure are shown. Particularly, FIGS. 2A-2C show side perspective views of the vessel 110 and the system 100, in which FIG. 2A shows the vessel 110 and the system 100 in a horizontal orientation, FIG. 2C shows the vessel 110 and the system 100 in a vertical orientation, and FIG. 2B shows the vessel 110 and the system 100 being lifted and oriented between the horizontal orientation and the vertical orientation.

As shown, one or more cables 190 may be used to assist in lifting the vessel 110 and system 100. FIGS. 2A-2C only provide views of the system 100 from the first side 126A. As such, in FIGS. 2A-2C, a first cable 190 is shown as coupled to the system 100. However, those having ordinary skill in the art will appreciate that views of the second side 126B would be substantially similar with a second cable coupled to the system 100.

In FIG. 2A, the first cable 190 may be used to connect to the first cable link 140A, thereby coupling the first cable 190 to the frame 120 and the vessel 110 of the system 100. As such, the first cable 190 may be supported by a lifting device, such as a crane or other appropriate equipment, in which the lifting device may be used to provide a lifting force on the first cable 190 to lift the top end 112 of the vessel 110 and the top end 122 of the frame 120 off of a supporting surface S. As the first cable 190 is lifted, the vessel 110 and the frame 120 of the system 100 may begin to rotate with respect to the supporting surface S, thereby having the bottom end 124 of the frame 120 remain as supported by the supporting surface S, whereas the top end 112 of the vessel 110 and the top end 122 of the frame 120 are raised off the supporting surface S and may be supported by the first cable 190.

Then, in FIG. 2B, as the system 100 is rotating and reorienting, the first cable 190 may engage the first cable support 150A. This configuration may enable the lifting force of the first cable 190 to translate through the first cable support 150A. As such, as the first cable support 150A is shown as disposed substantially aligned with the center-of-gravity of the vessel 110 from the perspective of the first side 126B of the system 100, the lifting force 190 may also be aligned with this center-of-gravity of the vessel 110. As shown, the first cable 190 may engage the first cable support 150A when the vessel 110 and the frame 120 of the system 100 are disposed at an angle between about 40 degrees and 60 degrees with respect to the supporting surface S, such as at an angle about 45 degrees, 50 degrees, or 55 degrees with respect to the supporting surface S.

When lifting the system 100 and as the system 100 is rotating and reorienting, the system 100 may reach a "tipping point" when the vessel 110 and the frame 120 of the system 100 are disposed at an angle between about 60 degrees and 80 degrees with respect to the support surface S, such as at an angle about 65 degrees, 70 degrees, or 75 degrees with respect to the supporting surface S. This point occurs when the center-of-gravity of the system 100 is oriented over the footprint of the system 100, such as when the center-of-gravity of the system 100 is oriented over and within the edges of the bottom end 124 of the frame 120. At this point, the center-of-gravity of the system 100 may move to no longer act to direct the system 100 in the horizontal orientation, but may direct the system 100 in the vertical orientation. By including the one or more supports 150A, 150B, the lifting force of the first cable 190 may translate through the first cable support 150A to prevent the system 100 from tipping and falling into the vertical orientation. Otherwise, the first cable 190 may temporarily slacken as the center-of-gravity of the system 100 shifts to orient in the vertical orientation, thereby having any operator effectively lose control of the system 100 while the first cable 190 is slack.

The lifting device may then continue to lift on the first cable 190, thereby enabling the system 100 to continue to rotate and reorient until in the vertical orientation, as shown in FIG. 2C. In FIG. 2C, the system 100 is disposed at an angle of about 90 degrees with respect to the supporting surface S, and the first cable 190 may be decoupled and disconnected from the system 100 such that the system 100 may be supported by the supporting surface S through the bottom end 124 of the frame 100. A similar reverse method to that shown in FIGS. 2A-2C may then be used when the system 100 is in a vertical orientation and is being reoriented to a horizontal orientation.

As shown in FIG. 2A, the first cable 190 may maintain a vertical orientation when first lifting through the first cable link 140A, thereby lifting the top end 112 of the vessel 110 and the top end 122 of the frame 120 off the supporting surface S. After the top end 112 of the vessel 110 and the top end 122 of the frame 120 have been raised a substantial distance off of the supporting surface S, such as when the vessel 110 and the frame 120 of the system 100 are disposed at an angle between about 40 degrees and 60 degrees with respect to the supporting surface S, the first cable 190 may then engage the first cable support 150A. When the first cable 190 engages the first cable support 150A, as shown in FIG. 2B, the first cable 190 may then position, at least partially, about the first cable support 1050A as the system 100 is further lifted and reoriented. As such, the lifting force from the first cable 190 may be translated through the first cable link 140A to lift and apply a rotational force to the system 100 and the vessel 110 in a first direction (e.g., in a counter-clockwise direction shown in FIGS. 2A-2C). Then, as the first cable 190 engages the first cable support 150A, the lifting force from the first cable 190 may be translated through the first cable support 150A to lift and apply a rotational force to the system 100 and the vessel 110 in a second direction (e.g., in a clockwise direction shown in FIGS. 2A-2C), thereby controlling the movement and forces applied to the system 100 as the system 100 and the vessel 110 move from a horizontal orientation to a vertical orientation.

After the first cable 190 engages the first cable support 150A, the portion of the first cable 190 extending between the first cable link 140A and the first cable support 150A may rotate and reorient along with the system 100, whereas the remainder of the first cable 190 (the portion of the first cable 190 extending above the first cable support 150A) may continue to maintain a vertical orientation. As the vessel 110 and the frame 120 of the system 100 then continue to be lifted from the lifting force translated through the first cable 190 into the first cable support 150A, such as lifted from an orientation shown in FIG. 2B to the vertical orientation shown in FIG. 2C, the portion of the first cable 190 extending between the first cable link 140A and the first cable support 150A may continue to rotate and reorient along with the system 100 until the system 100 is in a vertical orientation.

Those having ordinary skill in the art will appreciate that the present disclosure contemplates other arrangements and configurations for a system, a vessel, and a frame without departing from the scope of the present disclosure. For example, as shown and described above, the one or more cable links are shown as disposed adjacent to the front side of the frame and the system. However, in one or more other embodiments, the one or more cable links may be disposed at substantially any location within the frame and the system, in which the one or more additional cable supports may be used to facilitate lifting the system. In such embodiments, the one or more additional cable supports may be disposed in a substantially similar location as the one or more cable links shown and discussed above, thereby enabling the cables to still apply the lifting forces through the same locations and points of the system. Accordingly, the present disclosure contemplates other arrangements and configurations for a system, a vessel, and a frame, in addition to those discussed above, without departing from the scope of the present disclosure.

Advantageously, the present disclosure may provide a system that increases the control thereof when lifting and reorienting. For example, as discussed above, an operator of a lifting device may have additional control over the system, particularly at the tipping point of the system, when lifting and rotating the system from a horizontal orientation to a vertical orientation. This has the additional advantage of increasing the safety of the handling personnel and may prevent damage to the system and other equipment.

In one aspect, embodiments disclosed herein relate to a system including a vessel configured to contain a substance therein having a top end and a bottom end with a center-of-gravity for the vessel disposed between the top end and the bottom end, a frame connected to the vessel, a cable link connected to the frame configured to connect a cable thereto, and a cable support connected to the vessel or the frame. The cable support disposed above the center-of-gravity of the vessel with respect to the top end and the bottom end of the vessel.

In another aspect, embodiments disclosed herein relate to a method including connecting a cable to a cable link of a frame, the cable link secured to the frame, the flame secured to a vessel with the vessel having a top end, a bottom end, and a center-of-gravity therebetween, and moving the cable to move the vessel from a first position to a second position, the second position being closer to a vertical position than the first position. As the vessel moves from the first position to the second position, the cable engages the cable support such that a lifting force is translated from the cable and through the cable support to have the cable move the vessel through the cable supportl the cable support attached to the frame or the vessel with the cable support disposed above the center-of-gravity.

In another aspect, embodiments disclosed herein relate to a method including connecting a frame to a separator, the separator having a top end and a bottom end with a center-of-gravity for the separator disposed between the top end and the bottom end, connecting a first cable link to the frame closer to the top end of the separator than the bottom end of the separator, the cable link configured to secure to a cable, and connecting a first cable support to the separator or the frame, the first cable support disposed above the center-of-gravity of the separator. The first cable support comprises a cylindrical member extending from a first end adjacent to the separator of the frame to a second end, in which the first cable support has a flange adjacent the second end, the flange having a diameter greater than a diameter of the cylindrical member.

Although only a few example embodiments have been described in detail above those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A system comprising:
   a vessel configured to contain a substance therein having a top end and a bottom end with a center-of-gravity for the vessel disposed between the top end and the bottom end;
   a frame connected to the vessel;
   a cable link connected to the frame configured to connect a cable thereto; and
   a cable support connected to the vessel or the frame, the cable support disposed above the center-of-gravity of the vessel with respect to the top end and the bottom end of the vessel,
   wherein the cable comprises a first cable and a second cable, wherein the cable support comprises a first cable support to support the first cable therefrom and a second cable support to support the second cable therefrom.

2. The system of claim 1, wherein the cable support is disposed between the center-of-gravity and the top end of the vessel.

3. The system of claim 2, wherein the cable link is disposed above the center-of-gravity of the vessel with respect to the top end and the bottom end of the vessel, and wherein the cable link is disposed closer to the center-of-gravity of the vessel than the cable support.

4. The system of claim 1, wherein the vessel comprises a separator and the substance comprises a multiphase fluid.

5. The system of claim 1, wherein the vessel comprises a cylindrical body, and wherein the first cable support and the second cable support are disposed on opposite sides of the cylindrical body of the vessel.

6. The system of claim 1, wherein the first cable support is disposed on a first side of the frame, and wherein the second cable support is disposed on a second side of the frame.

7. The system of claim 1, wherein the cable support comprises a cylindrical member with a flange disposed at an end thereof.

8. The system of claim 7, wherein the flange has a larger diameter than the cylindrical member, and wherein the cable is positionable around the cylindrical member between the flange and the vessel or the frame.

9. The system of claim 7, wherein the cylindrical member has a first end and a second end, wherein the first end of the cylindrical member is disposed adjacent to the vessel or the frame and the flange is disposed adjacent the second end of the cylindrical member.

10. The system of claim 1, wherein the cable link comprises a pad eye.

11. The system of claim 1, wherein the frame comprises a platform with the platform connected to the vessel, and wherein the cable support is connected to the platform of the frame.

12. A method comprising:
connecting a cable to a cable link of a frame, the cable link secured to the frame, the frame secured to a vessel with the vessel having a top end, a bottom end, and a center-of-gravity therebetween; and
moving the cable to move the vessel from a first position to a second position, the second position being closer to a vertical position than the first position;
wherein, as the vessel moves from the first position to the second position, the cable engages the cable support such that a lifting force is translated from the cable and through the cable support to have the cable move the vessel through the cable support, the cable support attached to the frame or the vessel with the cable support disposed above the center-of-gravity.

13. The method of claim 12, wherein the cable engages the cable support by positioning the cable, at least partially, around the cable support to translate the lifting force from the cable through the cable support.

14. The method of claim 13, wherein the cable support cable support comprises a cylindrical member with a flange disposed at an end thereof, the flange having a larger diameter than the cylindrical member.

15. The method of claim 12, wherein moving the cable to move the vessel comprises:
translating the lifting force from the cable through the cable link to apply a rotational force in a first direction to the vessel; and
translating the lifting force from the cable through the cable support to apply a rotational force in a second direction to the vessel, the first direction substantially opposite to the first direction.

16. The method of claim 12,
wherein the cable comprises a first cable and a second cable, the cable support comprises a first cable support and a second cable support, the cable link comprises a first cable link and a second cable link,
wherein connecting the cable comprises connecting the first cable to the first cable link and connecting the second cable to the second cable link, and
wherein positioning the cable comprises positioning the first cable at least partially around the first cable support and positioning the second cable at least partially around the second cable support.

17. A method comprising:
connecting a frame to a separator, the separator having a top end and a bottom end with a center-of-gravity for the separator disposed between the top end and the bottom end;
connecting a first cable link to the frame closer to the top end of the separator than the bottom end of the separator, the cable link configured to secure to a cable; and
connecting a first cable support to the separator or the frame, the first cable support disposed above the center-of-gravity of the separator, the first cable support comprising a cylindrical member extending from a first end adjacent to the separator of the frame to a second end, wherein the first cable support has a flange adjacent the second end, the flange having a diameter greater than a diameter of the cylindrical member.

18. The method of claim 17, wherein the separator is movable between a first position and a second position with the cable positioning, at least partially, around the cylindrical member of the first cable support, the second position being closer to a vertical position than the first position.

19. The method of claim 17, wherein the flange is sized such that the cable remains between the first end and the second end of the cylindrical member when positioned, at least partially, around the cylindrical member of the first cable support.

* * * * *